United States Patent
Hayashi (10) Patent No.: US 9,151,930 B2
(45) Date of Patent: Oct. 6, 2015

(54) PLASTIC OPTICAL ELEMENT, MOLD FOR FORMING THE PLASTIC OPTICAL ELEMENT, LIGHT SCANNING DEVICE AND IMAGE FORMING APPARATUS HAVING THE LIGHT SCANNING DEVICE

(75) Inventor: Eiichi Hayashi, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 1905 days.

(21) Appl. No.: 11/399,432

(22) Filed: Apr. 7, 2006

(65) Prior Publication Data
US 2006/0262372 A1    Nov. 23, 2006

(30) Foreign Application Priority Data
Apr. 8, 2005    (JP) .................................. 2005-112350

(51) Int. Cl.
| | | |
|---|---|---|
| G02B 26/08 | (2006.01) | |
| G02B 26/10 | (2006.01) | |
| G02B 26/12 | (2006.01) | |
| G02B 13/00 | (2006.01) | |
| B29C 45/17 | (2006.01) | |
| B29C 45/56 | (2006.01) | |
| B29D 11/00 | (2006.01) | |

(52) U.S. Cl.
CPC .......... *G02B 13/0005* (2013.01); *B29C 45/174* (2013.01); *B29C 45/56* (2013.01); *B29D 11/00* (2013.01)

(58) Field of Classification Search
None
See application file for complete search history.

(56) References Cited

U.S. PATENT DOCUMENTS

| | | | |
|---|---|---|---|
| 6,620,486 B2* | 9/2003 | Kanematsu et al. .......... | 428/156 |
| 6,813,052 B2* | 11/2004 | Yoshizawa .................... | 359/216 |
| 6,919,120 B2 | 7/2005 | Yamanaka et al. | |
| 2003/0112486 A1* | 6/2003 | Kudo ............................ | 359/216 |
| 2004/0174581 A1* | 9/2004 | Iizuka et al. .................. | 359/204 |
| 2004/0184125 A1* | 9/2004 | Suzuki ......................... | 359/204 |
| 2005/0099663 A1* | 5/2005 | Hayashi ....................... | 359/204 |
| 2006/0176537 A1* | 8/2006 | Andoh .......................... | 359/216 |

FOREIGN PATENT DOCUMENTS

| | | | | |
|---|---|---|---|---|
| CN | 1247793 A | 3/2000 | | |
| JP | 4-127115 | 4/1992 | | |
| JP | 10-148777 | 6/1998 | | |
| JP | 11-28745 | 2/1999 | | |
| JP | 11064758 A * | 3/1999 | ............. | G02B 26/10 |
| JP | 2000-084945 | * 3/2000 | ........................ | 33/42 |
| JP | 2000-84945 | 3/2000 | | |
| JP | 2000-141413 | 5/2000 | | |
| JP | 2002-23090 | 1/2002 | | |

OTHER PUBLICATIONS

U.S. Appl. No. 11/837,890, filed Aug. 13, 2007, Kimura, et al.

* cited by examiner

*Primary Examiner* — Jade R Chwasz
(74) *Attorney, Agent, or Firm* — Oblon, McClelland, Maier & Neustadt, L.L.P.

(57) ABSTRACT

A plastic optical element being configured to collect and scan a beam emitted from at least one light source section, and including a transfer surface which extends in a principal direction corresponding to a scanning direction of the beam and has a curved surface formed to extend into a circular-arc shape in a secondary direction perpendicular to the principal scanning direction, the transfer surface having an optical aids disposed to shift from an outer center of the transfer surface in the secondary scanning direction, and a center of curvature of the curved surface being disposed on the optical axis.

14 Claims, 11 Drawing Sheets

PLASTIC OPTICAL ELEMENT, MOLD FOR FORMING THE PLASTIC OPTICAL ELEMENT, LIGHT SCANNING DEVICE AND IMAGE FORMING APPARATUS HAVING THE LIGHT SCANNING DEVICE

CROSS-REFERENCE TO THE RELATED APPLICATION

This application is based on and claims the priority benefit of Japanese Patent Application No. 2005-112350, filed on Apr. 8, 2005, the disclose of which is incorporated herein by reference in its entirety.

BACKGROUND OF THE INVENTION

1 Field of the Invention

The present invention relates to a plastic optical element configured to collect and scan beam emitted from a light source, a mold or forming the plastic optical element, a light scanning device including the plastic optical element and configured to scan beam emitted from at least one light source section and form an image based on image information, and an image forming apparatus having the light scanning device, which is, for example, an optical instrument such as a video camera or the like, a copying machine or forming a toner image trough an image forming process of an electrophotographic method, a facsimile device, a printer or a complex machine thereof, or the like.

2. Description of Related Art

Conventionally, there is known a light canning device installed in a multi-colored image forming apparatus configured to form images based on image information on photoconductor bodies by guiding beams emitted from a plurality of laser sources to the photoconductor bodies through a deflection device and an imaging device.

In recent years, to accomplish speeding up and high-quality image of the multi-colored image forming apparatus, an image forming apparatus such as a digital copying machine or laser printer or the like which is configured to arrange four photoconductor drums in a feeding direction of papers, expose images on the photoconductor drums by beams simultaneously, develop the images by a developer using different colors, yellow, magenta, cyan, and black, and transfer the images to the paper sequentially to overlap the images or forming a colored image has been put to practical use.

When light scanning is performed by use of the image forming apparatus, a plurality of light scanning devices are used. However, a large space is required for arrangement of the plurality of scanning devices. This results in a large-scaled image forming apparatus.

Therefore, a light scanning device including a single deflector for inputting and scanning a plurality of beams and imaging lenses which are stacked is known (or reference, Japanese Patent Laid-Open No. H 4-127115).

Known is also a light scanning device which includes a single deflector for inputting and scanning a plurality of beams, and imaging devices each of which is disposed to face a corresponding photoconductor for imaging an image on the photoconductor, and is configured to dispose optical elements constituting the imaging devices in a integrally stacked state in a secondary scanning direction perpendicular to a scanning direction of beam (for reference, Japanese Patent Laid-Open No. H 10-148777).

In this way, by stacking the optical elements in the secondary scanning direction, a thickness of a polygonal mirror or stacked polygonal mirrors in the deflector or deflection section can be reduced. Because one polygonal mirror is sufficient to scan the beams, it is possible to reduce a load on a motor for rotating the polygonal mirror and accomplish a compact light scanning device.

On the other hand, the following two proposals to demands for low cost of an optical element(s) or lens installed in the light scanning device have been made.

(1) Change From Material to Plastic Material

It is possible to form a transfer surface having a special mirrored shape and an outer shape of a wall biased in a longitudinal direction or scanning direction by an inexpensive material and low cost due to mass production.

(2) Introduction of an Aspheric Shape

It is possible to reduce the number of parts by introduction of a longitudinal asymmetric aspheric shape or the like to the mirrored shape.

In addition, the three proposals to demands for high accuracy of the optical element have been made.

(1) Reduction in Refractive-index Distribution

By disposing an optical alas at a position other than a center of an outer shape of a transfer su as proposed by the same inventors of the present application as in the preceding application, it is possible to reduce deterioration of an optical character due to an uneven refractive index (referred to as refractive-index distribution) existing inside the optical element. In this case, a characteristic that a primary factor (inclination) in a function of the refractive-index distribution does not affect the optical characteristic is utilized.

(2) Introduction of an Aspheric Shape

It is possible to reduce aberration in the optical element by introduction of the aspheric shape (longitudinal asymmetric aspheric shape) to the mirrored shape. In other words, the optical characteristic is improved.

(3) High accuracy of a Mirrored Surface

In a conventional plastic forming, it is desirable to uniform a rosin temperature and a resin pressure in a cavity of a mold in a process for cooling and solidifying a melted resinous material in the cavity in order to form a plastic molded article into a desired shape.

For example, the transfer surface has low farm accuracy for the reason that when the lens includes a shape having a biased wall, a cooling velocity of the resin by a difference of thickness of the optical element or lens is different every each location on the optical element to generate a different amount of volume contraction.

Therefore, by providing a concave non transfer surface formed by incomplete transfer in a position other than the transfer surface, a structure configured to reduce an inner pressure or internal strain in the resin, accomplish similar production cost to that of a molded article having a thin wall, and acquire a high accuracy plastic molded article is, also, known (see Japanese Patent Laid-Open No. 2000-84945).

As a concrete method for forming a concave non transfer slue on a portion of a surface other than the transfer surface, a method for forming the non-transfer surface by defining forcibly a gap between the resin to form the optical element and one cavity forming piece has been known (see Japanese Patent Laid-Open No. H 11-28745 and Japanese Patent Laid-Open No. 2000-141413).

The method includes the steps of providing slidably a part of the cavity forming piece for forming a s Glee including the non-transfer surface, preparing a pair of molds including at least one cavity armed by the cavity piece and the transfer surface, heating the mold at a temperature lower than a softening temperature of the resin and maintaining at that temperature, filling the cavity with the melted resin heated at a temperature higher than the softening temperature to perform injection mold, then allowing a resin pressure to occur in the transfer surface to closely fit the resin with the transfer surface, and thereafter, sliding the slidable cavity forming piece to separate from the resin when the resin is cooled to a temperature lower than the softening temperature.

However, with demands to achieve further high quality image in recent years, there is a significant problem on a process that the transfer surface adjacent the aura defining the gap forcibly between the resin and the cavity forming piece or the surface including the non-transfer surface has low form accuracy.

The non-transfer surface is difficult to control in depth. If the dopth is set over an optical effect range, the optical element disturbs lens function.

However, if an fθ lens having an optical axis disposed at a position other than a center of an outer shape of a transfer surface extending in a principal scanning direction corresponding to a sang direction of beam is disposed to face a deflection section or deflector, or across the deflector, the fθ lens disposed at one side of the deflector and the other fθ lens disposed at the other side of the deflector must be disposed in an upward and downward inverted state to correspond positions of photoconductors each having four yellow, magenta, cyan and black colors to the transfer surface in coordinate.

Inverting one of fθ lenses to the other upwardly and downwardly causes deflection of the optical axis of one fθ lens from the optical axis of the other fθ lens.

Consequently, because a polygonal mirror having a large thickness, or a plurality of polygonal mirrors in the deflector are required, a load on a motor to rotate the polygonal mirror (s) increases, and therefore a large-scaled motor is needed.

Accordingly, in a light scanning device in which conventional plastic optical element are disposed to face each other in both sides of a light source section, there is a problem that relative deflection of the optical axes of the plastic optic elements occur, the polygonal mirror has a large size, the load of the motor to rotate the polygonal mirror increases, and the light scanning device and an image forming apparatus become a large size to lower the quality of an image to be formed.

Furthermore, the conventional plastic optical element has the same problem as in the above-mentioned light device.

SUMMARY OF THE INVENTION

An object of the present invention is to provide a high accuracy, inexpensive and compact plastic optical element capable of disposing in a light scanning device easily, compactly and with high accuracy, reducing a load on a deflection section and forming a high accuracy image, a mold for forming the plastic optical element, an inexpensive, compact and high accuracy light scanning device capable of reducing a load on the deflection section and forming a high quality image, and an image forming apparatus having the light scanning device To accomplish the above-mentioned object, a plastic optical element according to one embodiment of the present invention is configured to collect and scan beam emitted from at least one light source section and includes a transfer surface which extends in a principal Hag direction corresponding to a scanning direction of the beam and has a curved surface formed to extend into a circular-arc shape in a secondary scanning direction perpendicular to the principal scanning direction.

The transfer surface has an optical axis disposed to shift from an outer center of the transfer surface in the secondary scanning direction. A center of curvature of the curved surface is disposed on the optical axis.

If two plastic optical elements are disposed to face each other at each side of the light source section, the faced plastic optical elements are disposed so that the optical axes are matched.

With the above structure, it is possible to accomplish compact and high accuracy arrangement of the plastic optical elements in the light scanning device, and provide a compact, inexpensive and high accuracy plastic optical element capable of reducing a load on the deflector and forming an image having high quality.

DETAILED DESCRIPTION OF THE PREFERRED EMBODIMENTS

Preferred embodiments of the present invention will be explained in detail with reference to the accompanying drawings below.

Figure 1A:
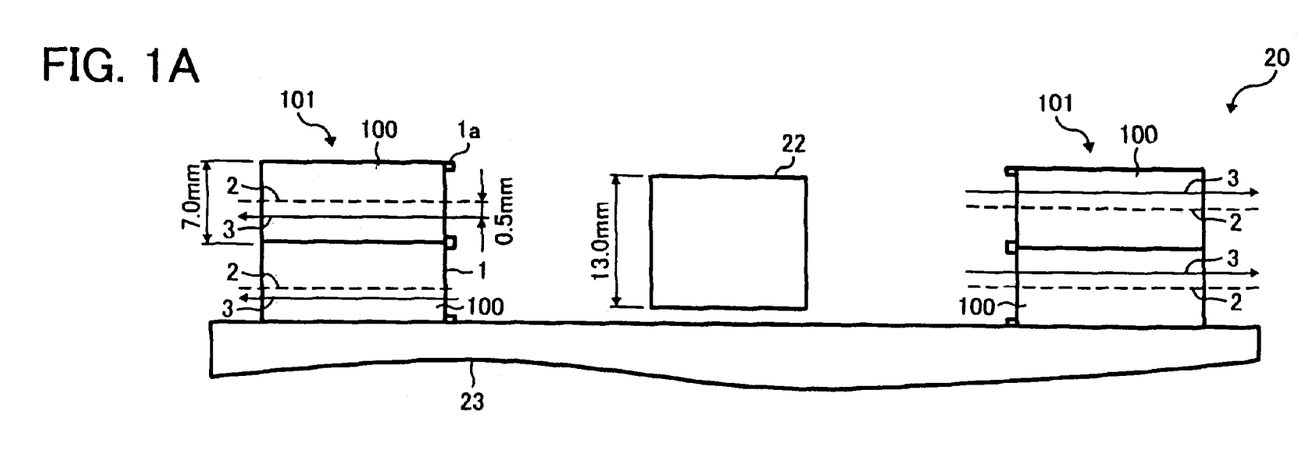
FIG. 1A is an explanatory view showing a state before adjusting a position of an optical axis of a plastic optical element in a light scanning device according to one embodiment of the present invention.
Figure 1B:
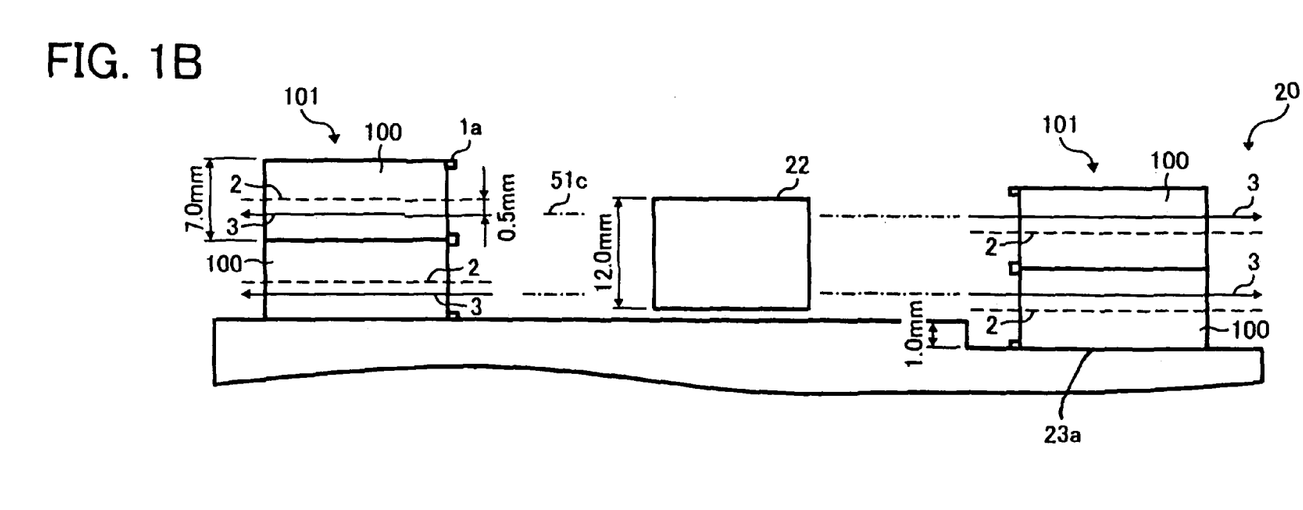
FIG. 1B its An explanatory view showing a state after adjusting the position of the optical axis of the plastic optical element shown in FIG. 1A.
Figure 3:
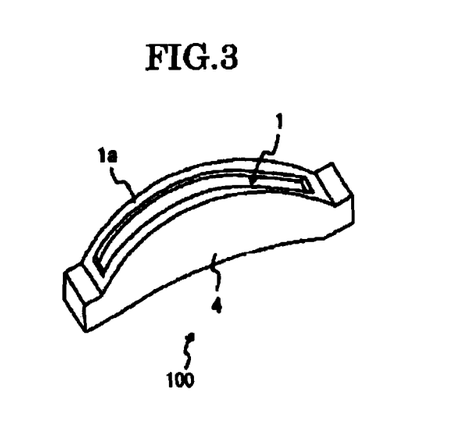
FIG. 3 is a perspective view showing one embodiment of the plastic optical element according to the present invention.

FIGS. 1A and 1B illustrate a first embodiment of a light scanning device 20 according to the present invention and FIG. 3 illustrates one embodiment of a plastic optical element 100 according to the present invention, which is applied to the light scanning device 20 (not shown in FIG. 3, see FIGS. 1A and 1B).

The plastic optical element 100 is disposed to face a light source section and configured to collect and scan beam emitted from the light source section.

Figure 12A:
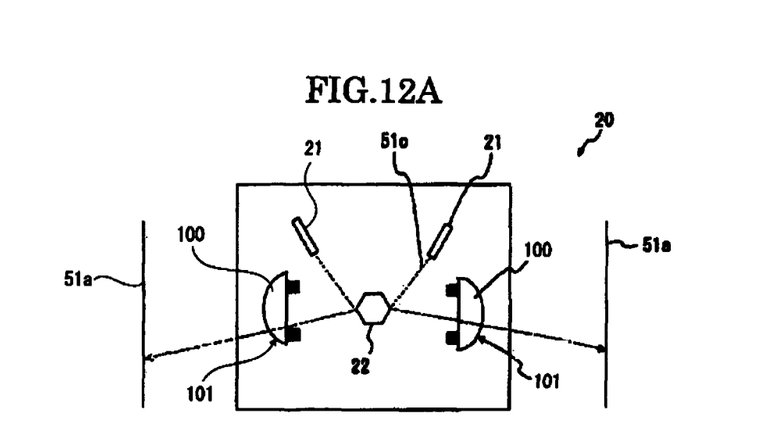
FIG. 12A is a plan view showing one embodiment of a light scanning device according to the present invention.
Figure 13A:
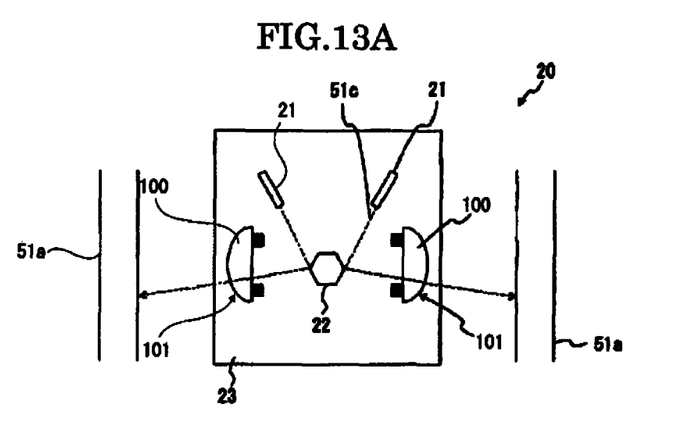
FIG. 13A is a plan view showing another embodiment of the light scanning device according to the present invention.

For example, the light source section includes at least one light source 21 to emit the beam and a deflection section 22 receiving the beam from the light source 21 and reflecting the beam and is configured to direct the reflected beam to the plastic optical element 100, as shown in FIGS. 12A and 13A. The deflection section 22 has, for example, a polygonal mirror.

The plastic optical element 100 is configured to receive the reflected beam from the polygonal mirror of the deflection section 22 and allow the reflected beam to scan to an object, for example, at least one photoconductor 51a (not shown in FIG. 1A, see FIG. 12A).

The plastic optical element 100 has a generally crescent-like shape and a transfer surface 1 which is disposed to face the photoconductor 51a and extends in a principal scanning direction which corresponds to a scanning direction of the beam. The transfer surface 1 has a gently curved surface extending in the principal scanning direction and a curved surface extending in a secondary direction (a direction of the thickness) perpendicular to the principal scanning direction.

Here, the transfer surface 1 may be formed in a par surface (not shown).

The plastic optical element 100 is disposed to oppose to the polygonal mirror of the deflection section 22. The transfer surface 1 has an optical axis 3 which is disposed to shift (eccentrically located) from a center line 2 of an outer shape of the transfer surface 1 in the secondary scanning direction (see FIG. 6). A center of curvature of the curved surface extending in the secondary scanning direction is positioned on the optical axis 3.

FIG. 1A illustrates a state in which the plastic optical element 100 structured as mentioned above is disposed in each side of the light source section of the light scanning device 20. In this embodiment, an element assembly 101 is disposed in each side of the light source con. For example, the element assembly 101 has a structure in which two plastic optical elements 100 are stacked in the secondary scanning direction.

In this case, the optical axes 3 of the right and left element assemblies 101 as viewed in FIG. 1A are disposed to shift from the center 2 of the outer shape because each optical awns 3 is eccentrically located from the center 2 of the outer shape of the transfer surface 1 as mentioned above.

Figure 2A:
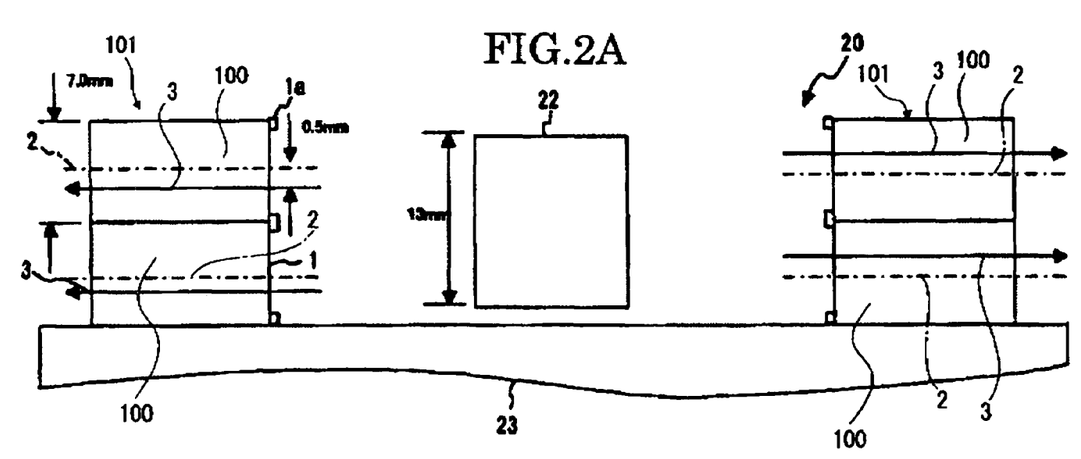
FIG. 2A is an explanatory view showing a state before adjusting a position of an optical axis of a plastic optical element in a light scanning device according to another embodiment of the present invention.
Figure 2B:
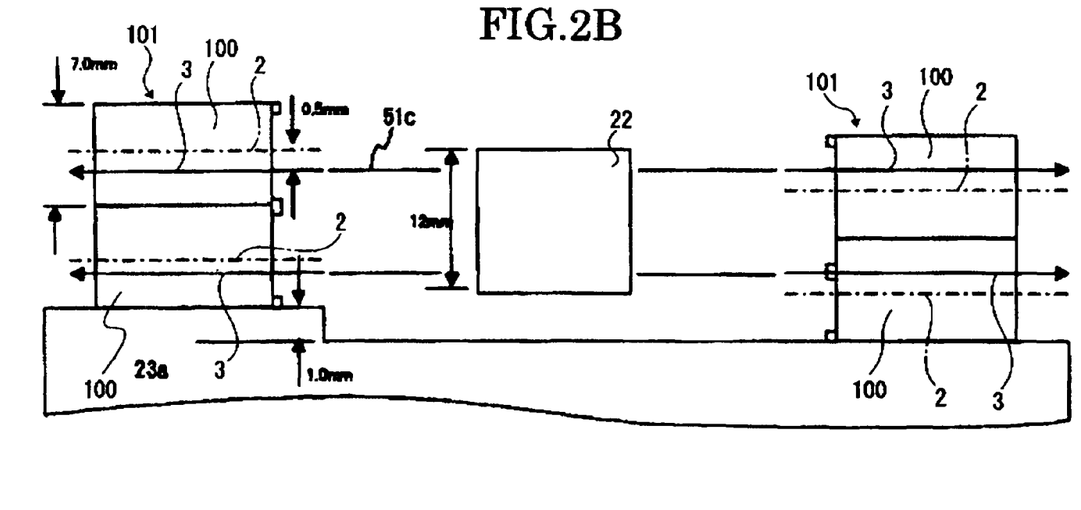
FIG. 2B is an explanatory view showing a state after adjusting the position of the optical aids of the plastic optical element shown in FIG. 2A.

In the present invention, the eccentric of the optical axes of the right and left element assemblies is corrected to match with respect to each other by means of the following structure (see FIGS. 2A and 2B).

For example, a transfer surface 1 of an fθ lens which is the plastic optical element 100 is set so that a size in the secondary scanning direction, in other words, a thickness of the plastic optical element 100 is 7.0 mm, an effective range of the plastic optical element is 5.0 mm, and the optical axis is shifted from the center 2 of the outer shape by 0.5 mm.

In this case, as shown in FIG. 1B, one end portion of a case 23 acing the polygonal mirror of the deflection section 22 is stepped downwardly as shown at 23a by 1.0 mm which is two times of 0.5 mm which is a shift amount (0.5 mm) of the optical axis 3 so that the optical axes 3 of each plastic optical element 100 of one of the right and left element assemblies are corrected to match with the optical axes 3 of each plastic element 100 of the other of the right and left element assemblies.

The fθ lens which is the plastic optical element 100 is disposed in the light scanning device 20 compactly, a compact polygonal mirror in the deflection section 22 is accomplished. More specifically, the polygonal mirror is changed from 13 mm to 12 mm in height, thereby reduction in load and miniaturization of a dive motor (not shown) can be accomplished.

However, the setting or calculation depends on a case that the beam is entered the fθ lens which is the plastic optical element 100 from the polygonal mirror of the deflection section 22 horizontally.

Furthermore, the plastic optical element 100 has stepped portions 1a provided on opposite edges, or upper and lower edges of the transfer surface 1 so that the upper and lower edges of the transfer surface 1 are higher than a central portion of the transfer surface in level (see FIG. 3). By the stepped portion 1a, the transfer surface 1 can be prevented from being damaged.

It is, also, to possible to achieve compact and higher accuracy arrangement of the plastic optical element in the light device 20 for scanning the plurality of beams and an inexpensive and high accuracy plastic optical element capable of reducing a load on the polygonal mirror of the deflection section 22 and forming an image having a high quality can be provided by disposing to stack the transfer surfaces of the plurality of plastic optical elements 100 in the secondary scanning direction and matching the optical axes of the plastic optical elements with respect to each other.

Because the optical axis 3 of the plastic optical element 100 is sifted by ½ or more of a diameter of light flux of beam 51c from the center 2 of the outer shape of the transfer surface 1 in the secondary scanning direction, it is possible to reduce deterioration of optical characteristic due to refraction distribution.

Accordingly, high accuracy and compact arrangement of the plastic optical elements in the light device 20 can be accomplished. In addition, a rotational load on a drive motor (not shown) of the polygonal mirror of the deflection section 22 is reduced and a high accuracy, inexpensive and compact plastic optical element capable of forming a high accuracy image can be provided.

Figure 4A:
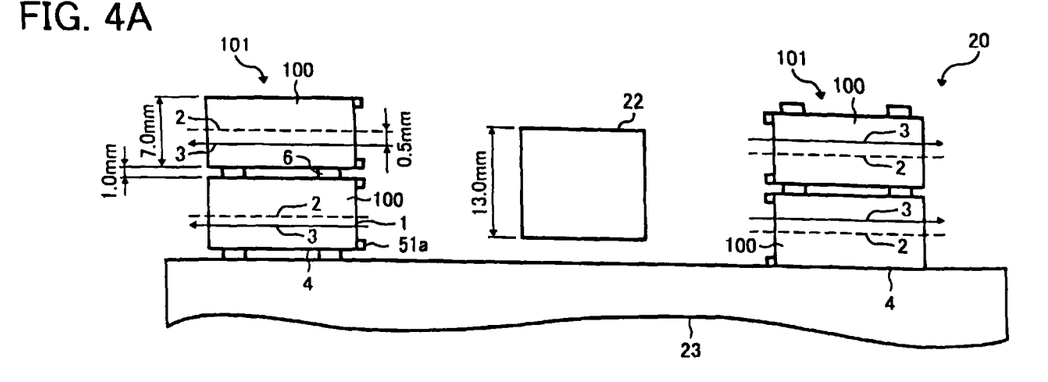
FIG. 4A is an explanatory view showing a state before adjusting a position of an optical axis of a plastic optical element in a light scanning device according to yet another embodiment of the present invention.
Figure 4B:
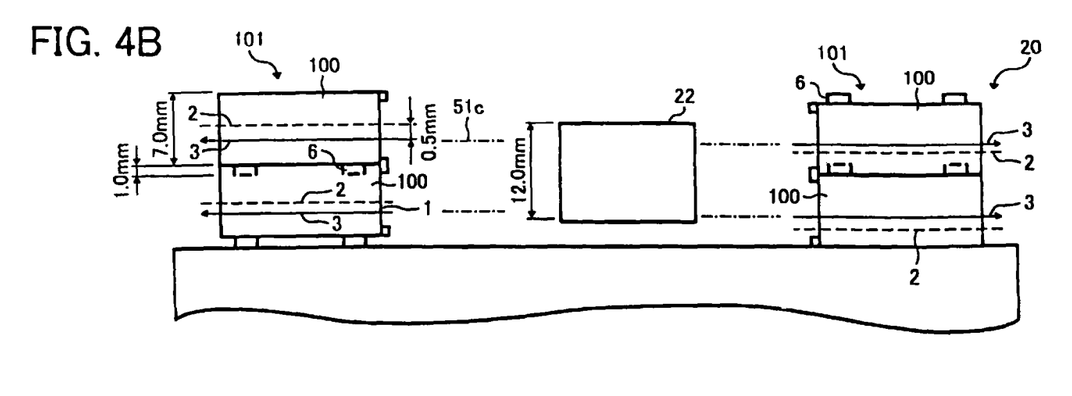
FIG. 4B is an explanatory view showing a state after adjusting the position of the optical aids of the plastic optical element shown in FIG. 4A.

As shown m FIGS. 4A and 4B, a plurality of stacked fθ lenses each of which is a component of the light scanning device 20 such as a color laser printer or the like may be used for element assemblies 101 in each of which the plastic optical elements 100 are died in a stacked state, as shown in FIGS. 4A and 4B.

Each of the element assemblies 101 formed from the stacked fθ lenses is disposed to face the polygonal of the deflection section 22.

FIG. 4 illustrates a state before correcting the position of the optical axis 3 of the plastic optical element 100 according to other embodiment of the present invention, in which at least one reference projection 6 provided on one plastic optical element 100 is not fitted in a concave portion (not shown) provided in a non-transfer surface 4 of another plastic optical element 100.

FIG. 4B illustrates a state after correcting the position of the optical axis 3 of the plastic optical element 100 according to the other embodiment of the present invention, in which the reference projection 6 provided on the one plastic optical element 100 is fitted in the concave portion provided in the non-transfer surface 4 of the other plastic optical element 100. In the illustrated embodiment, two projections are configured to fit in the corresponding concave portions (see FIG. 4B).

The transfer surface 1 of the fθ lens which is the plastic optical element 100 is structured so that a thickness is 7.0 mm, an effective range is 5.0 mm, and the optical axis 8 is shifted from the center 2 of the outer shape by 0.5 mm. In this case, a height of the reference pin 6 is set to be two times of a shifted amount (0.5 mm) of the optical axis 3. The reference projections 6 are fitted in the concave portions corresponding to the projections, respectively.

As shown in FIG. 4B, the optical axis of the plastic optical elements 100, or the fθ lenses of the right and left element assemblies 101 disposed to face the polygonal mirror of the deflection section 22 are matched each other.

In this embodiment, without converting a shape of the case 23, the plastic optical elements 100 are disposed in the light scanning device 20 compactly, a compact polygonal mirror in the deflection section because a height of the minor is changed from 13 mm to 12 mm and reduction in load on a drive motor (not showen) can be accomplished.

Figure 5:
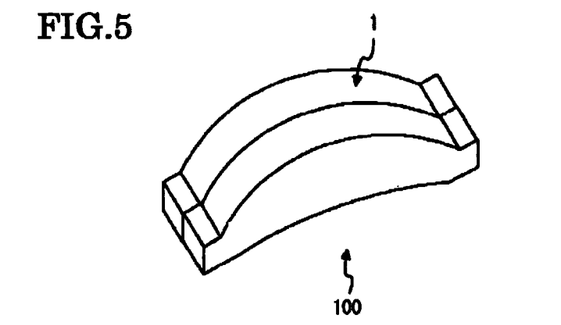
FIG. 5 is a perspective view showing another embodiment of the plastic optical element according to the present invention.

In FIG. 5, a plurality of plastic optical elements 100 are disposed in a stacked state integrally so that transfer surfaces 1 of these optical elements are disposed to be stacked in the secondary direction.

A m as shown in FIG. 1A to FIG. 2B, high accuracy and compact arrangement of the plastic optical elements in the light device 20 configured to scan the plurality of beams can be accomplished. In addition, a rotational load on a drive motor (not shown) of the polygonal mirror of the deflection section 22 is reduced, and a high accuracy, inexpensive and compact plastic optical element capable of forming a high accuracy image can be provided.

Figure 6:
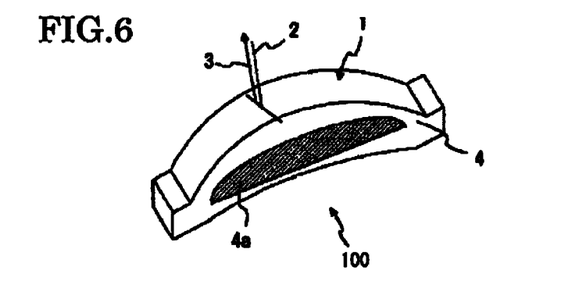
FIG. 6 is a perspective view showing further another embodiment of the plastic optical element according to the present invention.
Figure 7:
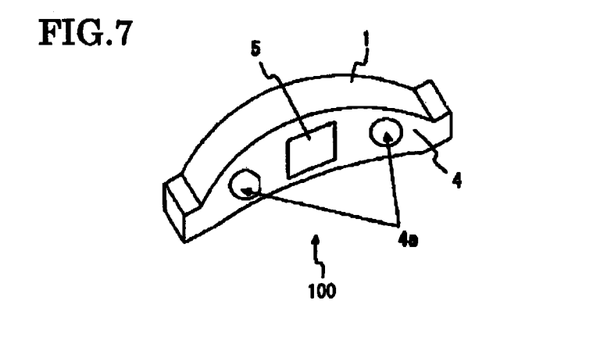
FIG. 7 is a perspective view showing further another embodiment of the plastic optical element according to the present invention.

In FIG. 6, a transfer surface 1 of a plastic optical element 100 is formed other than a non-transfer surface 4. As shown in FIG. 6, for example, at least one incomplete transfer portion 4a is provided on the non-transfer surface 4. A plurality of incomplete transfer portions 4a may be provided as shown in FIG. 7.

Shrinkage occurred due to cooling in forming the plastic optical element 100 is absorbed by movement of resin in the incomplete transfer portions 4a (see FIG. 7) formed on the non-transfer surface 4, the transfer surface is prevented from generating a sink and, an internal strain can be reduced.

Furthermore, the optical axis 3 of the plastic optical element 100 is shifted to the center 2 of outer shape of the transfer surface 1 in a direction opposite to the non transfer surface 4 on which the incomplete transfer portions 4a are formed.

According to the plastic optical element 100, it is possible to avoid low form accuracy and a poor area on appearance due to each depth of the incomplete transfer portions 4a and acquire a high accuracy transfer surface 1.

Accordingly, high accuracy and compact arrangement of the plastic optical elements in the light s g device 20 can be accomplished. In addition, a rotational load on a drive motor (not shown) of the polygonal mirror of the deflection section 22 is reduced, and a high accuracy, inexpensive and compact plastic optical element capable of forming a high accuracy image can be provided.

In FIG. 7, the non-transfer surface 4 on the plastic optical element 100 is formed on an extension surface of a reference surface 5 for mounting the plastic optical element, more specifically, the transfer surface 1. The plurality of incomplete transfer portions 4a are provided at positions across the reference surface 5 (see FIG. 7). Consequently, even if a portion in the non-transfer surface 4 is the transfer surface or the reference surface 5 provided on the transfer surface, it is possible to ensure the form accuracy of the plastic optical element 100.

In addition, by providing two or more incomplete transfer portions 4a on the non-transfer surface 4 and the reference surface 5 at the portions across the incomplete transfer portions 4a formed on the non-transfer surface 4 along the transfer surface 1, it is possible to provide a plastic optical element having a large area, prevent the plastic optical element from generating an inner pressure or internal strain of the resin, and increase form and optical accuracy or the like of the plastic optical element.

Meanwhile, at least one incomplete transfer portion 4a may be provided in a portion where form accuracy is not unnecessary even in the tranfer surface 1 and the reference surface 5.

Accordingly, high accuracy and compact arrangement of the plastic optical elements in the light scanning device 20 can be accomplished. In addition, a rotational load on the drive motor (not shown) of the polygonal mirror of the deflection section 22 is reduced, and a compact plastic optical element capable of forming a high accuracy image can be provided.

Figure 8:
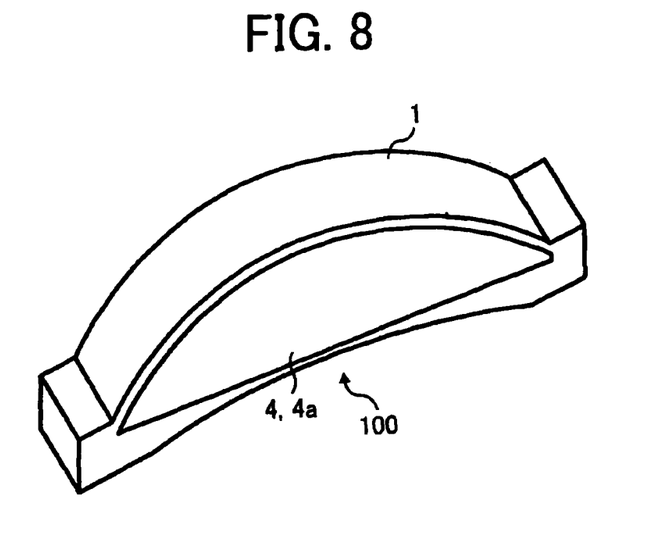
FIG. 8 is a perspective view showing further another embodiment of the plastic optical element according to the present invention.

In FIG. 8, an edge of the incomplete transfer portion formed on the non surface 4 in the plastic optical element 100 is armed to extend along a planar surface or curved surface of the transfer surface and with an interval from the transfer surface 1. Thereby, it is possible to provide an extending portion constituting the transfer surface and having a large area and prevent the plastic optical element from generating inner pressure or internal strain securely.

Accordingly, high accuracy and compact arrangement of the plastic optical elements in the light scanning device 20 (not shown, see FIGS. 1A and 1B) can be accomplished. In addition, a rotational load on the drive motor (not shown) of the polygonal mirror of the deflection section 22 (not shown, see FIGS. 1A and 1B) is reduced, and a compact plastic optical element capable of forming a high accuracy image can be provided.

Figure 9:
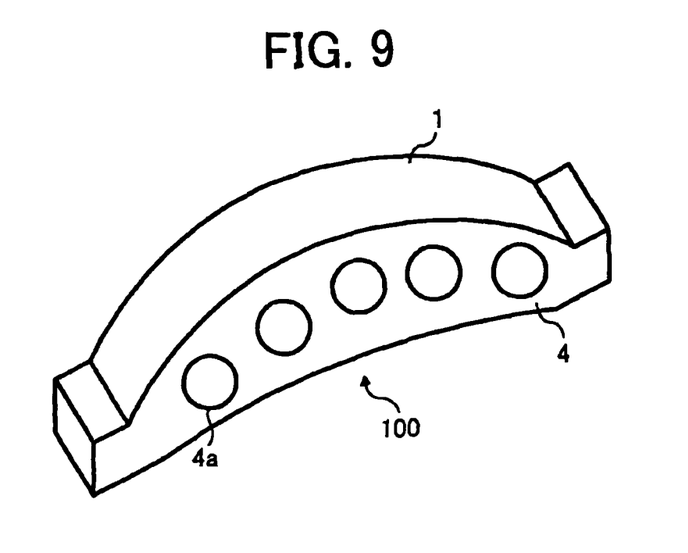
FIG. 9 is a perspective view showing yet another embodiment of the plastic optical element according to the present invention.

In FIG. 9, a plurality of incomplete transfer portions 4a are formed on the same surface of the non-transfer surface 4 other than the transfer surface 1. The plurality of incomplete 4a are formed to be arranged along the transfer surface 1 of the plastic optical element 100.

Consequently, it is possible to provide a plastic optical element having a large area and prevent the plastic optical element from generating inner pressure or internal strain generally or locally, whereby enhancing form and optical accuracy.

Accordingly, high accuracy and compact arrangement of the plastic optical elements in the light scanning device 20 (not shown, see FIGS. 1A and 1B) can be accomplished. In addition, a rotational load on a drive motor (not shown) of the polygonal mirror of the deflection section 22 (not shown, see FIGS. 1A and 1B) is reduced, and a high accuracy, inexpensive and compact plastic optical element capable of forming a high accuracy image can be provided.

Next, a mold for forming the above-mentioned plastic optical element is described.

For example, the mold 10 comprises an air supplying type-mold 10a and is configured to form the incomplete transfer portions 4a formed on the non-transfer surface 4 by incomplete transfer cared out at the time of forming by supplying compressed air in forming the plastic optical element 100 which is a molded article.

Figure 10A:
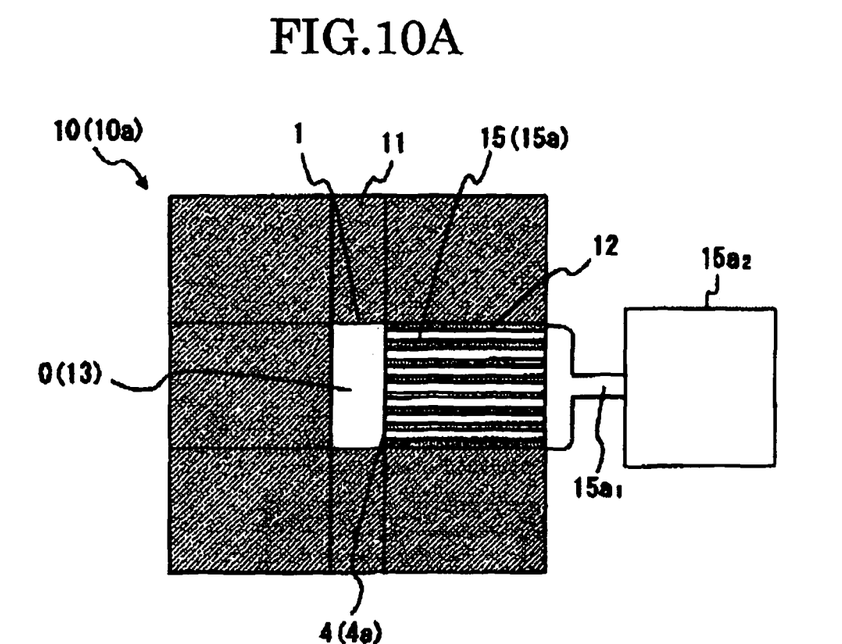
FIG. 10A is an explanatory view showing a main part of a mold for forming the plastic optical element.
Figure 10B:
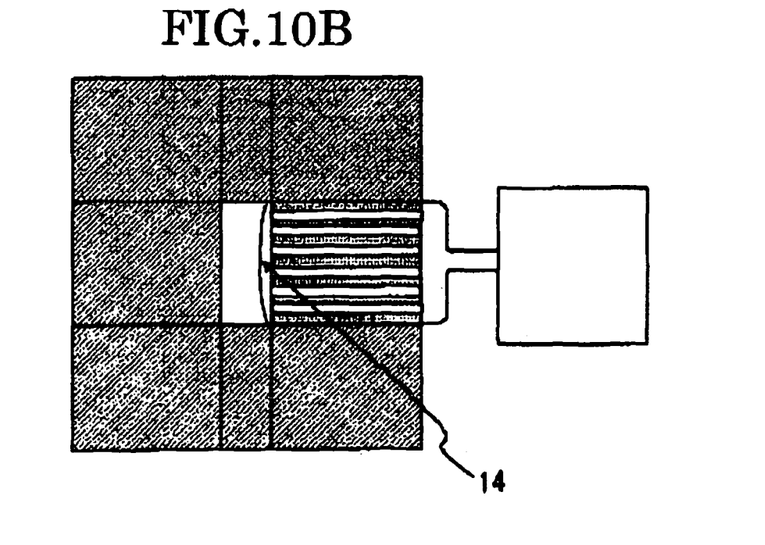
FIG. 10B is an explanatory view similar to FIG. 10A, showing a main part of the mold for forming the plastic optical element.

In FIGS. 10A and 10B (where FIG. 10B includes all of the references of 10A and additional reference 14), an air supplying type-mold 10a has a first cavity forming piece 11 for forming a surface including the transfer surface 1 of the plastic optical element 100 (not shown, see FIGS. 4A and 4B) and a second cavity forming piece 12 for forming a surface including the non-transfer surface 4 of the plastic optical element 100.

The mold, also, includes a gap forming device 15 configured to form a gap 14 between a resin for forming the plastic optical element 100 and the second cavity forming piece 12 for forming the non transfer surface forcibly, when the resin is cooled.

A cavity 13 formed by the first cavity piece for forming the transfer surface and the second cavity forming piece for forming the non-transfer surface 4 (not shown, see FIGS. 4A and 4B) is filled with the above-mentioned resin for forming the plastic optical element 100.

The gap forming device 15 has a vent hole 15a configured to supply air between the resin and the second cavity forming piece 12 for forming the non transfer surface 4 to form the plastic optical element 100.

Accordingly, high accuracy and compact arrangement of the plastic optical elements in the light scanning device 20 (not shown, see FIGS. 1A and 1B) can be accomplished. In addition, a rotational load on a drive motor (not shown) of the polygonal mirror of the deflection section 22 (not shown, see FIGS. 1A and 1B) is reduced, and a mold 10 or air supplying type-mold 10a for forming a high accuracy, inexpensive and compact plastic optical element capable of forming a high accuracy image can be provided.

The air supplying type-mold 10a includes at least one communicating opening $15a_1$ connected to the vent hole 15a and configured to supply compressed air to the plastic optical element 100 which is the molded article and a compressed air-supplying device $15a_2$ which is connected to the communicating opening $15a_1$ and disposed outside the mold.

The air supplying type-mold 10a forming the plastic optical element 100 is heated at a temperature lower than a temperature where the resin is softened and maintained at that temperature, and then the cavity 13 is filled with a melted resin heated at a temperature higher than the softening temperature for performing injection molding.

Next, a resin pressure is generated in the transfer surface 1 of the plastic optical element 100 which is the molded article to closely fit the resin with the transfer surface 1, thereafter, when cooling the resin to be a temperature lower than the softening temperature, the compressed air is supplied from the communicating opening 15a into the cavity 13 to impart it to the resin, as shown in FIG. 10B. Finally, the incomplete transfer portion(s) 4a is formed on the non-transfer surface 4 by forming the gap 14 forcibly between the resin for forming the plastic optical element and the second cavity forming piece 12 provided with the vent hole 15a.

In other words, by forming the gap 14 between the resin and the second cavity forming piece 12 forcibly, a surface of a resin portion facing the gap 14 becomes a free surface and is easy to move relatively to other surface.

Consequently, the resin portion facing the gap 14 is preferentially controlled to prevent the transfer surface 1 from generating a sink and relax the internal strain of the plastic optical element. Here, by setting a shape and arrangement of the vent hole 15a randomly, an area of forming a concave portion of the incomplete transfer portion 4a in the non-transfer surface 4 can be controlled.

Next, a sliding type-mold 10b configured to constitute the mold 10 for the plastic optical element 100 is described.

Figure 11A:
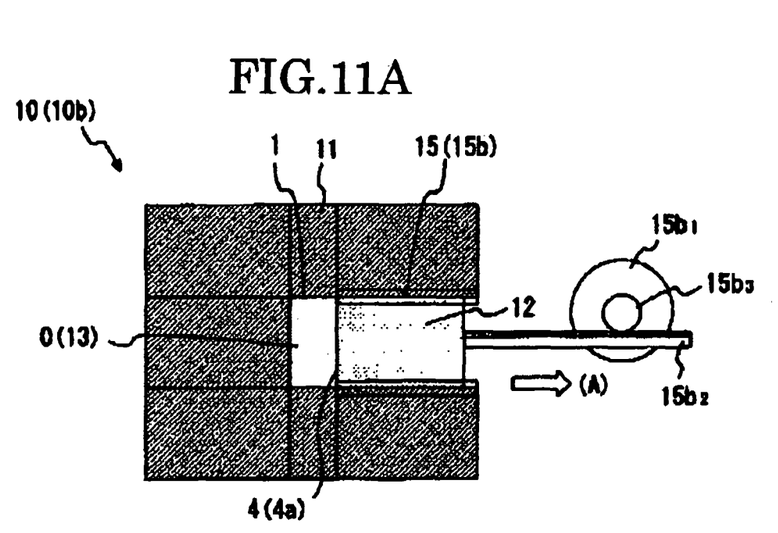
FIG. 11A is an explanatory view showing another main part of the mold for forming the plastic optical element.
Figure 11B:
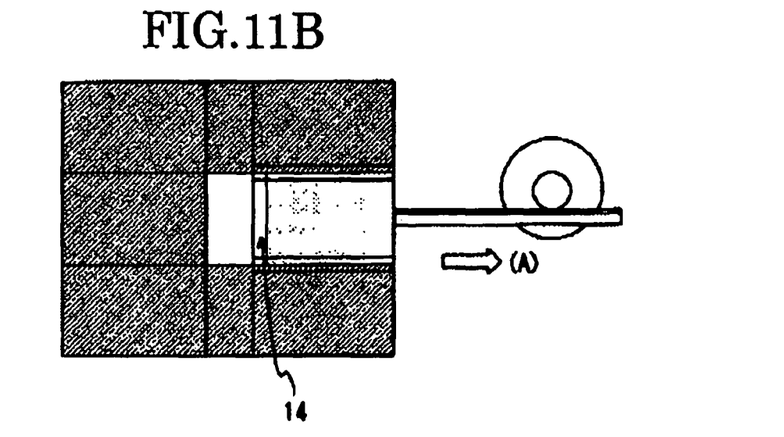
FIG. 11B is an explanatory view similar to FIG. 10A, showing further another main part of the mold for forming the plastic optical element.

The sliding type-mold 10b has a structure in which the second cavity forming piece 12 is configured to slide when forming the plastic optical element 100, thereby the incomplete transfer portion 4a is formed in the non-transfer surface 4 by the incomplete transfer performed when forming.

In FIGS. 11A and 11B (where FIG. 11B includes all of the references of 11A), a sliding type-mold 10b constitutes the mold for forming the plastic optical element 100 and has the generally same structure as the air supplying type-mold 10a. More specifically, the sliding type-mold 10b includes a first cavity forming piece 11 for forming a surface including the transfer surface 1 of the plastic optical element 100 and a second cavity forming piece 12 for forming a surface including the non-transfer surface 4 of the plastic optical element 100.

The mold, also, includes a gap forming device 15 configured to form a gap 14 between a resin for forming the plastic optical element 100 and the second cavity forming piece 12 for forming the non-transfer surface 4 forcibly, when the resin is cooled.

A cavity 13 formed by the first cavity piece for forming the transfer surface and the second cavity forming piece for forming the non-transfer surface 4 is filled with the above-mentioned resin for forming the plastic optical element 100.

The gap forming device 15 comprises a sliding section 15b to form the gap 14 between the resin and the second cavity forming piece 12.

Accordingly, high accuracy and compact arrangement of the plastic optical elements in the light canning device 20 can be accomplishes. In addition, a rotational load on a drive motor (not shown) of the polygonal mirror of the deflection section 22 is reduced, and a mold 10 or sliding-type mold 10b for forming a high accuracy, inexpensive and compact plastic optical element capable of forming a high accuracy image can be provided.

The sliding section 15b in the sliding type-mold 10b constituting the mold 10 is driven by a drive part $15b_1$ to be capable of sliding the second cavity forming piece 12 in a arrow directin A shown in FIG. 11A. The drive part $15b_1$ includes a rack $15b_2$ and a pinion $15b_3$ for engaging with the no The sliding type-mold 10b for forming the plastic optical element 100 is heated at a temperature lower than a temperature where the resin is softened and maintained at that temperature, and then the cavity 13 is filled with a melted resin heated at a temperature higher than the softening temperature fir performing injection molding.

Next, a resin pressure is generated in the transfer surface 1 of the plastic optical element 100 which is the molded article to closely fit the resin with the transfer surface 1, thereafter, when cooling the resin to be a temperature lower than the softening temperature, the second cavity forming piece 12 provided slidably on the siding section 15b is moved in the arrow direction A to separate from the resin, as shown in FIG.

11B. Thereby, the gap 14 is formed forcibly between the resin and the second cavity forming piece 12 so that the incomplete transfer portion(s) 4a is formed on the non-transfer surface 4.

With the above-mentioned structure, a forming can be cared out by lower pressure and lesser filling, and therefore it is possible to secure the form accuracy of the transfer surface 1 while reducing internal strain without generating the sink in the incomplete transfer portion(s) 4a of the non-transfer surface 4.

Moreover, the plastic optical element 100 formed by the mold 10 can be formed by use of various plastic moldings such as injection compression molding, gas-assist molding or the like other than the injection molding. In particular, it is desirable to use the injection molding from the points that a molded article having a thick wall and a biased wall can be efficiently formed and the sink is difficult to generate at any places on the molded article.

In the injection molding, because a surface layer of the resin is solidified and an inside of the resin is melted, right after the cavity is filled with the resin, the sink is difficult to be formed in-the incomplete t portion 4a of the non transfer surface 4 by separation of the resin and a wall surface of the cavity 13. In addition, the internal strain can, be reduced.

Here, the second cavity forming piece 12 configured to slide at the sliding section 15 which is the gap forming device 15 is formed into any shape, thereby an area for forming the incomplete transfer portion 4a of the non-transfer surface 4 can be easily controlled.

Meanwhile, in the mold 10 for the plastic optical element 100, when cooling the resin for forming the plastic optical element 100, with which the cavity 13 is filed, by supplying the compressed air through the vent hole 15a to the resin and sliding a portion of the second forming cavity 12 for forming the surface including the non-trans r surface 4 at the sliding section 15b, the incomplete transfer portion 4a can be farmed in the non-transfer surface 4.

By coupling two operations as mentioned above, it is possible to execute the forming with low-pressure and low-filling and to secure form accuracy of the transfer surface 1 efficiently while reducing the internal strain without generating the sink in the incomplete transfer portion 4a of the non-transfer surface 4.

Figure 12B:
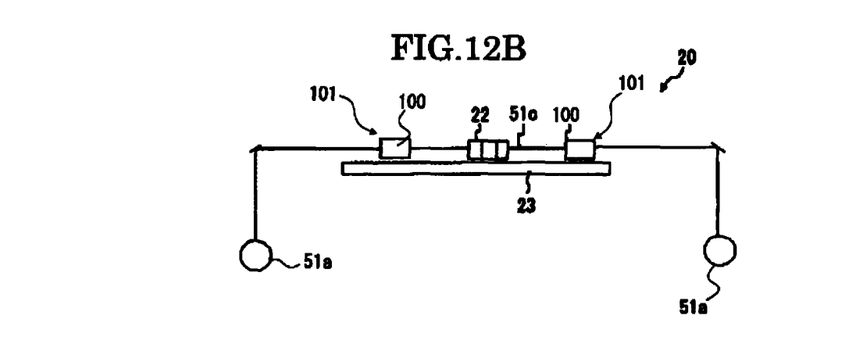
FIG. 12B is a side view of the light scanning device a shown in FIG. 12A

In FIGS. 12A and 12B, a light scanning device 20 is configured to form an image by scanning beams 51c which are emitted from a plurality of light sources 21 and based on image information and includes a deflection section 22 to deflect the beams 51c and element assemblies 101 including the plastic optical elements 100.

As shown in FIGS. 12A and 12B, the beams 51c emitted from the plurality of light sources 21 are deflected by the polygonal mirror of the same deflection section 22, pass through the element assemblies 101 provided to face each other on the both sides of the deflection section 22, on the respective photo conductors 51a, and scanned on the photoconductors to form an image based on the image information.

Consequently, a load on the drive motor (not shown) of the polygonal mirror of the deflection section 22 is reduced, and a high accuracy, inexpensive and compact light scanning device 20 capable of forming a high accuracy image can be provided.

Figure 13B:
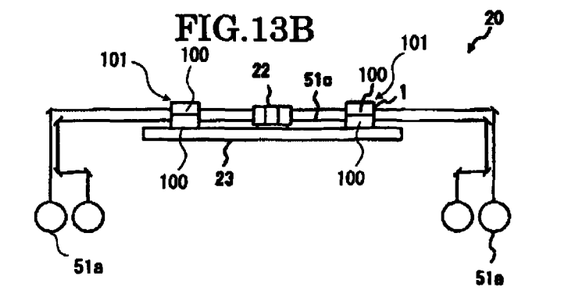
FIG. 13B is a side view of the light scanning device as shown in FIG. 13A.

In FIGS. 13A and 13B, a light device 20 is configured to scan beams 51c emitted from a plurality of light sources 21 to form an image based on image information and includes a deflection section 22 to deflect the beams 51c and element assemblies 101 which are disposed to face each other at both sides of the deflection section 22. Each of the element assemblies 101 includes plastic optical elements 100 disposed in a stacked state. Each of the plastic optical elements has a transfer surface 1. The transfer surfaces 1 of the plastic optical elements are disposed to be stacked in the secondary scanning direction and disposed to face photoconductors 51a.

As shown in FIGS. 13A and 13B, the beams 51c emitted from the plurality of light sources 21 are deflected by the polygonal mirror of the same deflection section 22, pass through the element assemblies 101 provided to face each other on the both sides of the deflection section 22, focused on the respective photoconductors 51a, and scanned on the photoconductors to form an image based on the image information.

Consequently, a rotational load on a drive motor (not shown) of the polygonal mirror of the deflection section 22 is reduced, and a high accuracy, inexpensive and compact light scanning device 20 capable of forming a great deal of colored images based on image information can be provided.

Figure 14:
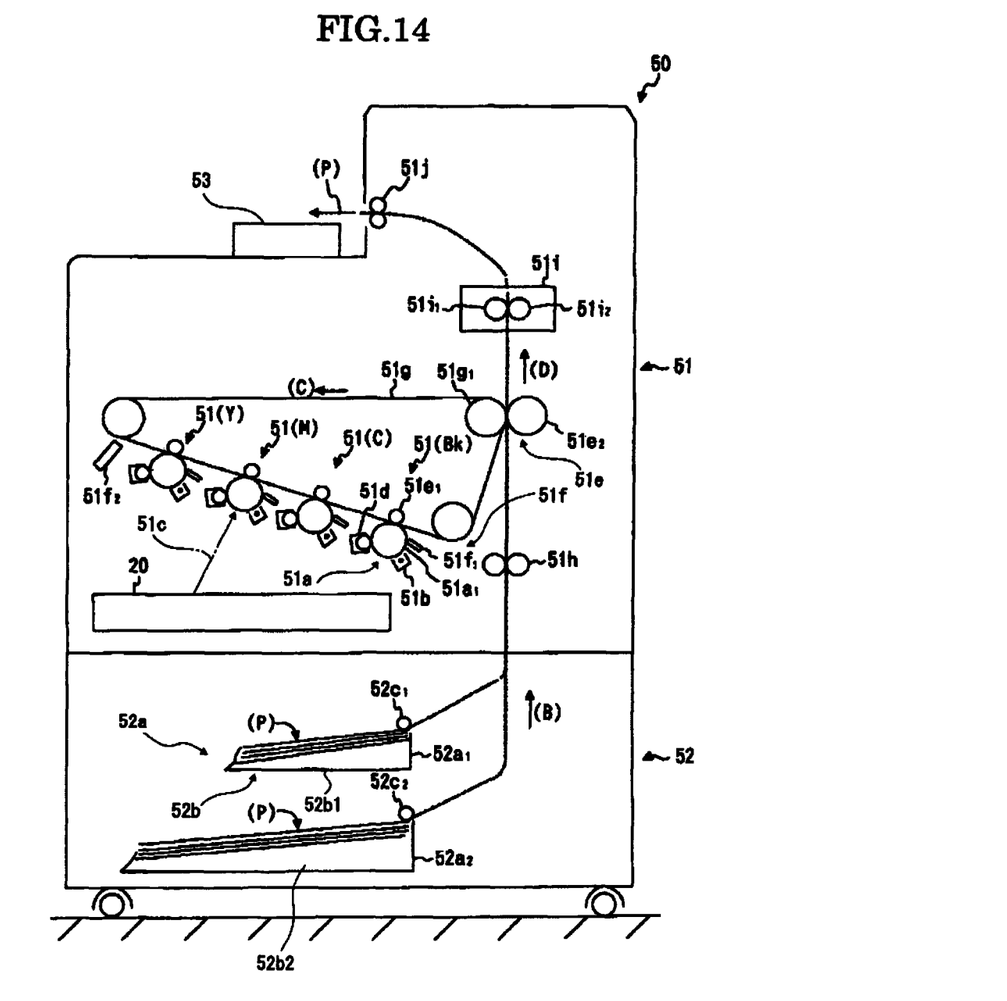
FIG. 14 is a schematic view showing an image forming apparatus to which the light scanning device according to the present invention is applied.

Referring to FIG. 14, an image forming apparatus 50 according to the present invention is shown.

The image forming apparatus 50 includes an image forming section 51 and a light scanning device 20 (not shown, see FIGS. 1A and 1B) provided in the image forming section 51 and is configured to scan a plurality of beams 51c to form an image based on image information. The light scanning device 20 has the structure as mentioned above.

Consequently, a load on the drive motor (not shown) of the polygonal mirror of the deflection section 22 is reduced, and a high accuracy, inexpensive and compact image forming apparatus 50 capable of forming a high accuracy image, can be provided.

The image forming section 61 is configured to form a recording image of toner on a recording paper which is a recorded medium P with high speed and high quality through an image forming process in an electro-photographic system.

The image forming apparatus 50 includes the image forming on 51 configured to form multi-colored recording images of toner on the recording paper which is the recording medium P, a supplying section 52 for supporting the image forming section 51 and for sending the recording medium P or recording paper in arrow direction B in FIG. 14, and a copy receiving tray 53 provided on an upper surface of the image forming section 51 and configured to receive and contain ejected recording papers. In illustrated embodiment, the image forming apparatus 50 is formed as a full color printer.

The supplying section 52 includes a paper cassette 52a which has an upper paper cassette part $52a_1$ and a lower paper cassette $52a_2$. If needed, other paper feeding device may be set.

In the image forming apparatus 50, the image forming section 51 includes a yellow image forming unit 51(Y), a magenta image forming unit 51(M), a cyan image forming unit 51(C), and a black image forming unit 51(B) which are installed in position of the image forming apparatus 50 and is configured to form a recording image of toner on the recording paper through the image forming process of the electro-photographic method.

A transfer device 51e is provided in the image forming section 51. The transfer device 51e includes an intermediate transfer belt 51g as an intermediate transfer member wound about a plurality of supporting rollers to move along a predetermined running path and a plurality of primary transfer rollers $51e_1$ disposed to face the photoconductor drums, respectively The transfer belt is moved by a drive roller $51g_1$ in arrow direction C. The yellow image forming unit 51(Y), the magenta image forming unit 51(M), the cyan image forming unit 51(C), and the black image forming unit 51(B) are removably disposed along a lower side of the transfer belt 51g.

In each of the yellow image forming unit 51(Y), the magenta image forming unit 51(M), the cyan image forming unit 51(C), and the black image fanning unit 51(B), provided peripherally of a photoconductor, for example, photoconductor drum 51a are a charging device 51b charging the photoconductor drum, a development device 51d to expose and develop an electrostatic latent image formed on a surface $51a_1$ of the photoconductor drum 51a, and a cleaning device 51f for removing remaining toner on the photoconductor drum 51a and recycling the toner. The cleaning device 51f includes a photoconductor cleaning unit $51f_1$.

The light scanning device 20 is disposed to face the photoconductor drums 51a and is configured to illuminate the beams including the image information toward the surface $51a_1$ of each of the photoconductor drums 51a.

As the image forming process, one multi-colored image is formed every one cycle of movement of the intermediate transfer belt 51g.

In the process, first, in the image forming section where the yellow image forming unit 51(Y) is disposed, yellow toner is developed by the development device 51d, and the developed image is transferred through the primary transfer roller $51e_1$ to the intermediate transfer belt 51g.

Next, in the image icing section where the magenta image forming unit 51(M) is disposed, magenta toner is developed by the development device 51d, and the developed image is transferred through the primary transfer $51e_1$ to the intermediate transfer belt 51g.

Next, in the image forming section where the cyan image forming unit 51(C) is disposed, cyan toner is developed by the development device 51d, and the developed image is transferred through the primary transfer roller $51e_1$ to the intermediate transfer belt 51g.

Finally, in the image forming section where the black image forming unit 51(B) is disposed, black toner is developed by the development device 51d, and the developed image is transferred through the primary transfer roller $51e_1$ to the intermediate transfer belt 51g.

The transfer device 51e includes a secondary transfer roller $61e_2$ which transfer secondarily four colored overlapped toner recording images on the intermediate transfer belt 51g on the recording paper. The cleaning device 51f includes a belt cleaning unit 51f for cleaning and recycling toner remained on the intermediate belt 51g after transferring secondarily. The secondary transfer roller 51e and the belt cleaning unit 51f are provided in position of the image forming section 51.

Furthermore, a fixing device 51i is provided in the middle of a moving path of the recording paper P in arrow direction D after the overlapped images are transferred to the recording paper by the secondary transfer roller $51e_2$. The fixing device 51i includes a heating roller $51i_1$ and a pressure roller $51i_2$.

The recording paper on which the transferred images are provided is and which passes through the heating roller $51i_1$ and the pressure roller $51i_2$ is ejected through an ejection roller 51j to the copy receiving tray 53 and contained therein.

In the supplying section 52, unused recording papers arc contained in the upper paper cassette part $52a_1$ and the lower paper cassette $52a_2$. Bottom plates 52b of the upper paper cassette part $52a_1$ and the lower paper cassette $52a_2$ are rotatably supported. A bottom plate part $52b_1$ of the upper paper cat part $52a_1$ and a bottom plate part $52b_2$ of the lower paper cassette $52a_2$ are capable of lifting the uppermost recording papers to be in contact with pickup rollers $52c_1$ and $52c2$, respectively. The uppermost recording paper is sent out from the upper paper cassette part $52a_1$ or the lower paper cassette $52a_2$ by rotation of the pickup roller $52c_1$ or $52c_2$ to be supplied to a pair of resist rollers 51h.

The resist rollers 51h are configured to stop temporarily the conveyance of the recording paper so that a positional relationship between the images on the intermediate transfer belt 51g and the recording paper is adjusted to be matched in a predetermined position and move with a predetermined timing again.

Consequently, a load on the drive motor (not shown) of the polygonal mirror of the deflection section 22 is reduced, and a high accuracy, inexpensive and compact image forming apparatus 50 including a compact and inexpensive light scanning device 20 and capable of forming a high accuracy image can be provided.

According to the present invention, as mentioned above, because the compact, high accuracy and inexpensive plastic optical element capable of forming high quality image can be provided, compact and high accuracy arrangement of the plastic optical elements in the light scanning device 20 can be a accomplished, and therefore a load on the polygonal mirror can be reduced.

Although the preferred embodiments of the present invention have been mentioned, the present invention is not limited to these embodiments, various modifications and changes can be made to the embodiments.

What is claimed is:

1. A light scanning apparatus, comprising:
   a plurality of light sources configured to emit beams based on image information;
   a deflection section configured to deflect the beams emitted from the light sources; and
   a plurality of plastic optical element units, each of which is disposed on each side of the deflection section, the plastic optical element units being disposed to face each other, each of the plastic optical element units including a plurality of stacked plastic optical elements, wherein each of the stacked plastic optical elements includes
      a transfer surface extending in a principal scanning direction corresponding to a scanning direction of one of the beams, and
      a curved surface formed to extend into a circular-arc shape in a secondary scanning direction generally perpendicular to the principal scanning direction, the transfer surface having an optical axis disposed to shift from a center of an outer shape of the transfer surface in the secondary scanning direction generally perpendicular to the principal scanning direction,
   wherein a center of curvature of the curved surface is disposed on the optical axis,
   wherein the stacked plastic optical elements are stacked so that the optical axis of each of the stacked plastic optical elements is shifted from the respective center of the outer shape of the transfer surface in a same direction, and
   wherein the optical axes of the stacked plastic optical elements of one of the plastic optical element units disposed on one side of the deflection section are disposed to match with the optical axes of the stacked plastic optical elements of an other one of the plastic optical element units disposed on an other side of the deflection section, the transfer surface of the one of the plastic optical element units being reversely disposed upwardly and downwardly with respect to the transfer surface of the other one of the plastic optical element units.

2. The light scanning apparatus according to claim 1, wherein
the one of the plastic optical element units is configured to be disposed with at least one other plastic optical element unit, having a same shape as the one of the plastic optical element units, on each side of the light source section, and
the one of the plastic optical element units and the at least one other plastic optical element unit are disposed to face each other.

3. The light scanning apparatus according to claim 1, wherein
the transfer surface includes a central portion and stepped portions, and
the stepped portions are provided at two edges of the central portion and are higher than the central portion in level.

4. The light scanning apparatus according to claim 2, wherein the transfer surface of one of the plastic optical elements is configured to be disposed integrally with a transfer surface of at least one other plastic optical element having a same shape as the one of the plastic optical elements.

5. The light scanning apparatus according to claim 1, further comprising a non-transfer surface, wherein the transfer surface is formed at a position other than the non-transfer surface.

6. The light scanning apparatus according to claim 5, wherein the optical axis is shifted from the center of the outer shape of the transfer surface in the secondary scanning direction in a direction opposite to the non-transfer surface on which at least one incomplete transfer portion is formed.

7. The light scanning apparatus according to claim 6, wherein an edge of the at least one incomplete transfer portion is formed to extend along a planar surface or curved surface of the transfer surface and with an interval from the transfer surface.

8. The light scanning apparatus according to claim 6, wherein a plurality of incomplete transfer portions are formed on a same plane other than the transfer surface.

9. The light scanning apparatus according to claim 8, wherein the plurality of incomplete transfer portions are formed at a position across a reference surface for mounting one of the plastic optical elements.

10. The light scanning apparatus according to claim 8, wherein the plurality of incomplete transfer portions are disposed along the transfer surface.

11. The light scanning apparatus according to claim 5, wherein the non-transfer surface is formed on an extension surface of a reference surface for mounting one of the plastic optical elements.

12. The light scanning apparatus according to claim 1, wherein the optical axis is shifted from the center of the outer shape of the transfer surface in the secondary scanning direction by ½ or more of a diameter of light flux of the beam.

13. An image forming apparatus, comprising:
an image forming section configured to form an image, and
a light scanning apparatus including
a plurality of light sources configured to emit beams based on image information,
a deflection section configured to deflect the beams emitted from the light sources, and
a plurality of plastic optical element units, each of which is disposed on each side of the deflection section, the plastic optical element units being disposed to face each other, each of the plastic optical element units including a plurality of stacked plastic optical elements, each of the stacked plastic optical elements including
a transfer surface extending in a principal scanning direction corresponding to a scanning direction of one of the beams, and
a curved surface formed to extend into a circular-arc shape in a secondary scanning direction generally perpendicular to the principal scanning direction, the transfer surface having an optical axis disposed to shift from a center of an outer shape of the transfer surface in the secondary scanning direction generally perpendicular to the principal scanning direction,
wherein a center of curvature of the curved surface is disposed on the optical axis,
the stacked plastic optical elements are stacked so that the optical axis of each of the stacked plastic optical elements is shifted from the respective center of the outer shape of the transfer surface in a same direction,
the optical axes of the stacked plastic optical elements of one of the plastic optical element units disposed on one side of the deflection section are disposed to match with the optical axes of the stacked plastic optical elements of an other one of the plastic optical element units disposed on an other side of the deflection section, the transfer surface of the one of the plastic optical element units being reversely disposed upwardly and downwardly with respect to the transfer surface of the other one of the plastic optical element units, and
an image based on the image information is formed by scanning the beams in the image forming section.

14. The image forming apparatus according to claim 13, wherein the image forming section is configured to form a recording image of toner through an image forming process of an electro-photographic method.

* * * * *